(12) United States Patent
Butcher

(10) Patent No.: US 7,246,094 B1
(45) Date of Patent: Jul. 17, 2007

(54) METHOD OF STRUCTURING A CREDIT ENTAILING A FIXED PAYMENT COMPONENT AND A VARIABLE PAYMENT COMPONENT

(75) Inventor: George H. Butcher, New Rochelle, NY (US)

(73) Assignee: Goldman Sachs & Co., New York, NY (US)

( * ) Notice: Subject to any disclaimer, the term of this patent is extended or adjusted under 35 U.S.C. 154(b) by 1051 days.

(21) Appl. No.: 09/919,456

(22) Filed: Jul. 31, 2001

(51) Int. Cl.
*G06Q 40/00* (2006.01)
(52) U.S. Cl. .......................................... 705/39; 705/35
(58) Field of Classification Search ................ 705/39, 705/35
See application file for complete search history.

(56) References Cited

U.S. PATENT DOCUMENTS 5,966,700 A * 10/1999 Gould et al. .................. 705/38
6,052,673 A * 4/2000 Leon et al. ................... 705/38
2002/0184129 A1* 12/2002 Arena et al. .................. 705/35

OTHER PUBLICATIONS

Kuntz, E.F. Poor Market Spurs New Approaches. Pensions & Investment Age. Chicago: Apr. 16, 1984. vol. 12, Iss. 8. (8 pages).*

* cited by examiner

*Primary Examiner*—Richard E. Chilcot, Jr.
*Assistant Examiner*—Jennifer L. Liversedge
(74) *Attorney, Agent, or Firm*—Greenberg Traurig, LLP

(57) ABSTRACT

In one embodiment a method of structuring a municipal bond issued by a credit issuer to a credit holder, comprising requiring the credit issuer to pay to the credit holder a fixed payment component; and requiring the credit issuer to pay to the credit holder a variable payment component that varies based on changes in a value of an ownership value characteristic which is associated with the municipal bond and wherein the ownership characteristic is selected from the group including: a) a general interest rate level; b) an exemption from a state tax; c) an exemption from a federal tax; d) a marginal state tax rate; e) a marginal federal tax rate; f) a credit rating of the credit issuer; g) a credit variation associated with a credit enhancer; h) a credit variation associated with a liquidity provider; and i) a supply/demand level for municipal bonds.

8 Claims, No Drawings

METHOD OF STRUCTURING A CREDIT ENTAILING A FIXED PAYMENT COMPONENT AND A VARIABLE PAYMENT COMPONENT

FIELD OF THE INVENTION

The present invention relates to a method of structuring a credit issued by a credit issuer to a credit holder. More particularly, the present invention relates to a method of structuring a credit issued by a credit issuer of a municipal bond to a credit holder including, in one embodiment: requiring the credit issuer to pay to the credit holder a fixed payment component; and requiring the credit issuer to pay to the credit holder a variable payment component that varies based on changes in a value of an ownership value characteristic which is associated with the credit.

BACKGROUND OF THE INVENTION

Municipal and non-municipal credits (such as loans, bonds, securities, or other obligations) traditionally include a number of ownership value characteristics. Further, each of these ownership value characteristics has associated therewith a potential risk and a potential benefit (hereinafter collectively referred to as "loss/gain potential").

With regard to traditional fixed rate bonds (e.g. traditional municipal fixed rate bonds), the bondholder typically assumes all of the loss/gain potential of each ownership value characteristic associated with the bond (that is, the bondholder traditionally assumes all of the risks and benefits of bond ownership). In issuing such fixed rate debt, an issuer typically pays its fixed rate bondholders a higher interest rate (versus non-fixed rate debt) to accept all of the risks and benefits of ownership of the debt. In essence, the issuer purchases insurance against these risks from its fixed rate bondholders. The compensation to the fixed rate bondholders includes both a higher fixed rate as well as the rights to the potential benefits associated with ownership of the debt.

On the other hand, with regard to traditional variable rate demand bonds ("VRDBs"), the issuer typically retains all of the loss/gain potential of each ownership value characteristic associated with the bond (that is, the issuer retains all of the risks and benefits of bond ownership). The interest rate on such traditional VRDBs is periodically reset to maintain the value of the bonds equal to par, thereby causing the issuer to benefit from favorable market conditions and to bear the cost of unfavorable market conditions.

In any case, as seen in Table 1, a number of representative characteristics that generally affect the value of ownership of municipal debt (and the associated risks and benefits of ownership) include:

TABLE 1

Representative Characteristics That Affect The Value of Ownership of Municipal Bonds

| Characteristic | Risk | Benefit |
| --- | --- | --- |
| General level of interest rates | Increasing rates | Decreasing rates |
| Exemption from state tax | Decrease in marginal tax rate or repeal of exemption | Tax increase |
| Credit of issuer | Improvement in credit | Credit deterioration |
| Credit of credit enhancer | Improvement in credit | Credit deterioration |
| Credit liquidity provider | Improvement in credit | Credit deterioration |

TABLE 1-continued

Representative Characteristics That Affect The Value of Ownership of Municipal Bonds

| Characteristic | Risk | Benefit |
| --- | --- | --- |
| Supply and demand for municipal bonds | Increase in supply or decrease in demand | Decrease in supply or increase in demand |

By issuing traditional fixed rate debt, an issuer may essentially fully hedge each of the above characteristics (i.e., the issuer fixes both the cost and the benefit derived from the bond issuance). In contrast, by issuing traditional variable rate demand debt, an issuer may essentially retains all of the loss/gain potential of each ownership value characteristic associated with the bond.

DETAILED DESCRIPTION OF THE INVENTION

As required, detailed embodiments of the present invention are disclosed herein; however, it is to be understood that the disclosed embodiments are merely exemplary of the invention that may be embodied in various forms. Therefore, specific structural and functional details disclosed herein are not to be interpreted as limiting, but merely as a basis for the claims and as a representative basis for teaching one skilled in the art to variously employ the present invention.

In one embodiment, a method of structuring a credit issued by a credit issuer to a credit holder is provided, including: requiring the credit issuer to pay to the credit holder a fixed payment component; and requiring the credit issuer to pay to the credit holder a variable payment component that varies based on changes in a value of an ownership value characteristic which is associated with the credit.

The credit may be a bond. The bond may be a municipal bond. The fixed payment component may be a fixed interest payment component and the variable payment component may be a variable interest payment component.

The ownership value characteristic upon which the variation of the variable payment component is based may be selected from the group including: a) a general interest rate level; b) an exemption from a state tax; c) an exemption from a federal tax; d) a marginal state tax rate; e) a marginal federal tax rate; f) a credit rating of the credit issuer; g) a credit variation associated with a credit enhancer; h) a credit variation associated with a liquidity provider; and i) a supply/demand level for municipal bonds.

In another embodiment, a method of issuing a credit to a credit holder by a credit issuer, wherein the credit has associated therewith at least two ownership value characteristics and each of the ownership value characteristics has associated therewith a loss/gain potential is provided, including: transferring to the credit holder at least one loss/gain potential; and retaining by the credit issuer at least one loss/gain potential.

The loss/gain potential may be transferred to the credit holder by requiring the credit issuer to pay to the credit holder a fixed payment component and the loss/gain potential may be retained by the credit issuer by requiring the credit issuer to pay to the credit holder a variable payment component. The credit may be a bond. The bond may be a municipal bond. The fixed payment component may be a fixed interest payment component and the variable payment component may be a variable interest payment component.

The variation of the variable payment component may be based upon a change in value of an ownership value characteristic selected from the group including: a) a general interest rate level; b) an exemption from a state tax; c) an exemption from a federal tax; d) a marginal state tax rate; e) a marginal federal tax rate; f) a credit rating of the credit issuer; g) a credit variation associated with a credit enhancer; h) a credit variation associated with a liquidity provider; and i) a supply/demand level for municipal bonds.

In summary, one embodiment of the present invention may operate as follows. Rather than transferring all of the loss/gain potential of each ownership value characteristic associated with a credit (such as a bond) to the credit holder, the issuer could transfer the loss/gain potential of at least one ownership value characteristic to the credit holder and retain the loss/gain potential of at least one ownership value characteristic for itself.

More particularly, in one embodiment of the present invention the desired risk/benefit allocation could be accomplished by having the issuer pay to a credit holder, in addition to a fixed component of interest, an additional variable component of interest that varies based on favorable or unfavorable changes in a current value of the ownership value characteristic whose loss/gain potential is retained by the issuer.

In one particular example of the present invention (which is intended to present but one example, and which is not intended to be restrictive), the issuer retains the loss/gain potential of the ownership value characteristic corresponding to the issuer's credit rating.

In this regard it is noted (in connection with a traditional fixed rate bond) that by paying for the cost of transferring loss/gain potential associated with the issuer's credit rating to the bondholder, an issuer essentially imposes a higher cost on its current ratepayers or taxpayers (hereinafter "Payers"). This is in order to avoid the possibility of imposing a higher cost on the issuer's Payers at some future time when the issuer's credit deteriorates. Since the quality of the issuer's future credit will presumably be (at least to some extent) within the issuer's control, it may be seen by some to be inequitable for current Payers to pay the cost of insuring future Payers against a deterioration of the issuer's credit. Moreover, in transferring loss/gain potential associated with the issuer's credit rating to the issuer's fixed rate bondholders using the traditional approach, the issuer also deprives future Payers of the opportunity to benefit from favorable changes in the issuer's credit.

In any case, to retain the loss/gain potential associated with the issuer's credit rating according to an embodiment of the present invention the issuer could agree to paying to the bondholder a variable component of interest based on the issuer's credit rating. For example, the additional interest could vary by a predetermined amount (e.g., a decrease in rating category costs an additional five basis points) or by formula (e.g., by the then current spread between the municipal market data ("MMD") rate for a given maturity and the rate for a similarly rated bond).

In another particular example of the present invention (which is intended to present but one example, and which is not intended to be restrictive), the issuer retains the loss/gain potential of the ownership value characteristic corresponding to a tax rate or exemption (e.g., a federal tax rate or exemption).

In this regard it is noted that many municipal issuers traditionally have debt that is exclusively fixed. In other words, those issuers current Payers have paid (and continue to pay) for the cost of insuring future Payers against tax risk on essentially 100% of the issuer's debt portfolios. It is believed that the construction of many a municipality's debt portfolios on a fixed rate basis has been encouraged by: i) previously having a minimum number of ways for an issuer to retain tax risk such as by issuing traditional variable rate debt or by using interest rate swaps; and ii) essentially having no readily available tools for hedging the budgetary risk of traditional variable rate debt.

In any case, the issuance of fixed rate bonds with an additional interest component that varies based on a tax rate or exemption loss/gain potential according to the present invention may provide an alternative way for an issuer (e.g., a municipal issuer) to retain tax rate and/or exemption loss/gain potential.

More particularly, in one embodiment of the present invention the payment of the additional variable interest component could be based either on the value of a federal tax exemption and/or on a marginal tax rate.

For example (which is intended to present but one example, and which is not intended to be restrictive), an issuer's bond could bear both a fixed interest rate (i.e., having a fixed payment component) plus an additional interest rate (i.e., having a variable payment component) that varies based on the marginal tax rate as follows:

Fixed Rate=$TEQR \times (1-MTR)$ and

Additional Interest Rate=$FDMTR \times TEQR$

Where "TEQR" is the issuer's taxable equivalent fixed rate; "MTR" is a percentage approximately equal to the marginal tax rate at the time of issuance; and "FDMTR" is the future decrease in the marginal tax rate.

It is believed that this approach may allow an issuer to realize a higher percentage of the value of a tax benefit, such as a favorable rate or an exemption (versus the traditional approach). More particularly, in the absence of any change in the tax system that reduces the marginal tax rate or that reduces the value of a tax exemption (e.g., passage of a national sales tax or a value added tax and de-emphasis of the income tax), the interest rate on long-term fixed rate bonds should be approximately:

Interest Rate=$TEQR \times (1-MMTR)$

Where "TEQR" is the issuer's taxable equivalent fixed rate; and "MMTR" is the maximum marginal tax rate.

In one example, the maximum marginal tax rate for individuals is 38% and the maximum marginal tax rate for corporations is 35%. Therefore, based on the supply/demand factors relating to individuals, municipal bonds should trade between 62% and 65% of TEQR.

This is where short-term debt such as traditional VRDBs typically trade. As discussed above, with traditional VRDBs, the issuer retains all of the risks of ownership (including tax risk). The interest rate on traditional VRDBs is periodically reset to maintain the value of the bonds equal to par, thereby causing the issuer to benefit from favorable market conditions and to bear the cost of unfavorable market conditions. Since the issuer, not the bondholder, typically bears the risk of unfavorable developments with respect to tax rate and/or exemption, the bonds trade very close to their theoretical percentage of TEQR.

On the other hand, traditional long-term fixed rate bonds regularly trade at rates that range between 70% and 85% of TEQR and, on occasion, trade at higher percentages of TEQR. By retaining the tax risk according to one embodiment of the present invention, it is believed that the issuer should be able to achieve rates much closer to the 62% to 65% of TEQR currently achieved with traditional VRDBs.

Further, it should be noted that given an upward sloping yield curve, realizing a greater percentage of the value of a tax benefit (such as an exemption) for fixed rate bonds has an even greater value than it does with traditional VRDBs (i.e., the issuer should achieve a greater reduction in interest cost, as compared to TEQR, on the long end of the yield curve).

Finally, regardless of the particular loss/gain potential retained by the issuer, it is believed that the total of the fixed and variable components of interest would, at least initially, be lower than the rate on a similar traditional fixed rate bond since the bondholder's risk would be reduced (because the issuer is retaining some of the risk). In addition, it is believed that the result should be a lower cost of finds for current Payers and greater inter-generational equity as between current and future Payers.

While a number of embodiments of the present invention have been described, it is understood that these embodiments are illustrative only, and not restrictive, and that many modifications may become apparent to those of ordinary skill in the art. For example, the additional variable interest payment could be structured so that the issuer retains the credit downside and/or the credit upside (i.e., the issuer could retain only the loss potential associated with one or more ownership value characteristics and/or the issuer could retain only the gain potential associated with one or more ownership value characteristics and/or the issuer could retain both the loss potential and the gain potential associated with one or more ownership value characteristics). Further, while the invention has been described with reference to an example in which the issuer retains the loss/gain potential of the issuer credit rating ownership value characteristic and with reference to an example in which the issuer retains the loss/gain potential of the tax rate/exemption ownership value characteristic, it is noted that the issuer may retain the loss/gain potential of any desired ownership value characteristic(s). For example, the issuer may instead retain the interest rate loss/gain potential and transfer other loss/gain potential(s). More generally, the issuer may retain or transfer the loss/gain potential of one or more ownership value characteristic(s) specifically described herein, or of any other desired ownership value characteristic(s). Further still, the present invention may be used in the context of a municipal and/or non-municipal credit issue. In the municipal context, because the risk of default is typically so low, the right to receive additional variable interest may have particular value. Further still, the present invention may be utilized with a credit which has a variable rate and/or a fixed rate, each of which may be "natural" and/or synthetic" (e.g., created using an interest rate swap). Further still, the credit may be unhedged, and/or imperfectly hedged, and/or perfectly hedged. Further still, the variable payment component may vary based on changes in a past value, and/or current value, and/or future value of an ownership value characteristic which is associated with the credit. Further still, while the present invention has been described principally with respect to a method for structuring a credit, a corresponding software program and/or system may of course be utilized to structure or help structure a credit.

What is claimed is:

1. A computer implemented method of structuring a credit, comprising:
    requiring the credit issuer of a municipal bond to pay to the credit holder a first payment component associated with the municipal bond, wherein the first payment component is a fixed payment component; and
    requiring the credit issuer of the municipal bond to pay to the credit holder an additional, second payment component associated with the municipal bond, wherein the second payment component is a variable payment component that varies based on changes in a value of an ownership value characteristic which is associated with the municipal bond;
    wherein the ownership value characteristic is selected from the group consisting of: a) a general interest rate level; b) an exemption from a state tax; c) an exemption from a federal tax; d) a marginal state tax rate; e) a marginal federal tax rate; f) a credit rating of the credit issuer; g) a credit variation associated with a credit enhancer; h) a credit variation associated with a liquidity provider; and i) a supply/demand level for municipal bonds.

2. The method of claim 1, wherein the fixed payment component is a fixed interest payment component and the variable payment component is a variable interest payment component.

3. A computer implemented method of issuing a credit to a credit holder by a credit issuer, wherein the credit has associated therewith at least two ownership value characteristics and each of the ownership value characteristics has associated therewith a loss/gain potential, comprising:
    transferring to the credit holder at least one loss/gain potential; and
    retaining by the credit issuer at least one loss/gain potential;
    wherein the loss/gain potential is transferred to the credit holder by requiring the credit issuer to pay to the credit holder a first payment component associated with the credit, wherein the first payment component is a fixed payment component; and
    wherein the loss/gain potential is retained by the credit issuer by requiring the credit issuer to pay to the credit holder an additional, second payment component associated with the credit, wherein the second payment component is a variable payment component.

4. The method of claim 3, wherein the credit is a bond.

5. The method of claim 4, where the bond is a municipal bond.

6. The method of claim 5, wherein the variation of the variable payment component is based upon a change in value of an ownership value characteristic selected from the group consisting of: a) a general interest rate level; b) an exemption from a state tax; c) an exemption from a federal tax; d) a marginal state tax rate; e) a marginal federal tax rate; f) a credit rating of the credit issuer; g) a credit variation associated with a credit enhancer; h) a credit variation associated with a liquidity provider; and i) a supply/demand level for municipal bonds.

7. The method of claim 5, wherein the variation of the variable payment component is based upon a change in value of an ownership value characteristic selected from the group consisting of: a) an exemption from a state tax; b) an exemption from a federal tax; c) a marginal state tax rate; and d) a marginal federal tax rate.

8. The method of claim 3, wherein the fixed payment component is a fixed interest payment component and the variable payment component is a variable interest payment component.

* * * * *